United States Patent
Shi et al.

(10) Patent No.: US 8,524,348 B1
(45) Date of Patent: Sep. 3, 2013

(54) STACKED FILM OPTICAL DATA STORAGE DEVICE AND METHOD OF MANUFACTURE

(75) Inventors: Xiaolei Shi, Schenectady, NY (US); Peter William Lorraine, Niskayuna, NY (US); Victor Petrovich Ostroverkhov, Ballston Lake, NY (US); Ri-an Zhao, Niskayuna, NY (US)

(73) Assignee: General Electronics Company, Niskayuna, NY (US)

( * ) Notice: Subject to any disclaimer, the term of this patent is extended or adjusted under 35 U.S.C. 154(b) by 0 days.

(21) Appl. No.: 13/459,840

(22) Filed: Apr. 30, 2012

(51) Int. Cl.
*G11B 7/24* (2006.01)

(52) U.S. Cl.
USPC .................... 428/64.1; 428/64.4; 430/270.11; 369/275.3

(58) Field of Classification Search
USPC ................ 428/64.4; 430/270.11; 369/275.3
See application file for complete search history.

(56) References Cited

U.S. PATENT DOCUMENTS

| | | | |
|---|---|---|---|
| 5,320,514 A | 6/1994 | Kanome et al. | |
| 5,527,497 A | 6/1996 | Kanome et al. | |
| 6,767,439 B2 | 7/2004 | Park | |
| 7,144,241 B2 | 12/2006 | Hennessey et al. | |
| 8,194,520 B2* | 6/2012 | Shi et al. | 369/103 |
| 2005/0276211 A1 | 12/2005 | Hirotsune et al. | |
| 2008/0083099 A1 | 4/2008 | Jones | |
| 2008/0273441 A1 | 11/2008 | Van Der Tempel et al. | |
| 2011/0103211 A1* | 5/2011 | Fujita et al. | 369/100 |

OTHER PUBLICATIONS

T. Togashi et al., "Dual Layer Phase Change Optical Disk using Limit Equalizer," IEEE 0-7803-7379-0, pp. 410-412, 2002.

* cited by examiner

*Primary Examiner* — Elizabeth Mulvaney
(74) *Attorney, Agent, or Firm* — Joseph J. Christian

(57) ABSTRACT

A data storage device includes a substrate layer, made of a moldable non-photopolymer plastic substrate and having a servo layer, adjoined to a stacked film structure that is constructed of multiple functional films, having data layers, with spacer film(s) disposed between each of the functional films. Methods of manufacturing the data storage device include using a roll-to-roll system to adhere thin spacer film extrusions between the multiple functional film extrusions so as to construct the stacked film structure. An additional method uses an application of functional film coating to thin spacer films and a roll-to-roll system.

49 Claims, 4 Drawing Sheets

STACKED FILM OPTICAL DATA STORAGE DEVICE AND METHOD OF MANUFACTURE

CROSS-REFERENCE TO RELATED APPLICATIONS

This application is related in parts to both commonly assigned, U.S. application Ser. No. 13/563,194, entitled STACKED FILM THRESHOLD COMPONENT, DEVICE, AND METHOD OF MANUFACTURE, filed on Jul. 31, 2012 and U.S. application Ser. No. 13/708,107, entitled STACKED FILM REFLECTIVE LAYERS FOR MULTI-LAYER OPTICAL DATA STORAGE, filed on Dec. 7, 2012, the entire contents of both which are incorporated by reference herein.

BACKGROUND OF THE INVENTION

The present invention relates generally to data storage devices and methods of manufacturing the devices, and more particularly to a stacked film optical data storage device and a method of manufacture of the same.

Optical data storage, such as for example micro-holographic data storage, enables large number of data layers in a single disc, or diskette, to achieve high data capacity. Typically, the disc has a thick monolithic block of functional material used for hologram recording. This functional material is a thermo-plastic with threshold response to incident laser light intensity. This block is usually at least 200 μm in thickness, wherein a large number (e.g., 20 or more) of data layers are stored in this block. Since the hologram functions as little mirrors to provide a reflection signal, there are no metal layers in the disc structure.

This functional material has a certain level of linear absorption from doping molecules. These molecules respond to incident light and enable the hologram recording. By increasing the concentration of these molecules, the sensitivity of the material is improved. However, increasing the concentration also brings increased linear absorption. In order to achieve a large number of data layers, the linear absorption of the material has to be controlled so that the light beam can propagate and reach the bottom data layer without suffering a huge light power loss.

In, for example, micro-holographic storage, there remains this tradeoff of sensitivity and data storage density due to the linear absorption of dyes in the threshold material. This tradeoff is essentially taken as a constraint, or 'given', and the problem is mitigated by optimizing other components of the threshold material.

Accordingly, there is an ongoing opportunity for improving upon existing optical data storage structures and methods of manufacture.

BRIEF DESCRIPTION

The present invention overcomes at least some of the aforementioned drawbacks by providing an improved data storage device that breaks with the traditional tradeoff between sensitivity and data storage density. More specifically, the present invention is directed to providing a stacked film optical data storage device and methods of manufacture.

Therefore, in accordance with one aspect of the invention, a data storage device comprises a substrate layer comprising a moldable non-photopolymer plastic substrate and servo layer therein; and a stacked film structure adjoining the substrate layer, the stacked film structure further comprising a plurality of functional films, wherein each functional film includes a data layer; and at least one spacer film disposed between the plurality of functional films.

In accordance with another aspect of the invention, a method of manufacture comprises providing a plurality of thin functional film extrusions; providing a plurality of thin spacer film extrusions; transporting the plurality of thin functional film extrusions and the plurality of thin spacer film extrusions, via a roll-to-roll system; aligning the plurality of thin functional film extrusions with the plurality of thin spacer film extrusions; and adhering plurality of thin functional film extrusions and the plurality of thin spacer film extrusions together, thereby forming a stacked film structure, the stacked film structure defined by a thin space film extrusion located between two thin functional film extrusions.

In accordance with another aspect of the invention, a method of manufacture comprises providing a thin spacer film, via a roll-to-roll system; applying a functional film coating to the thin spacer film; curing the thin space film and the functional film thereby creating a functional film and thin spacer film pair; transporting a plurality of functional film and thin spacer film pairs, via a roll-to-roll system; aligning the plurality of functional film and thin spacer film pairs; and thermally adhering the plurality of functional film and thin spacer film pairs together, thereby forming a stacked film structure.

Various other features and advantages of the present invention will be made apparent from the following detailed description and the drawings.

BRIEF DESCRIPTION OF THE DRAWINGS

The drawings illustrate one embodiment presently contemplated for carrying out the invention.

DETAILED DESCRIPTION

Figure 1:
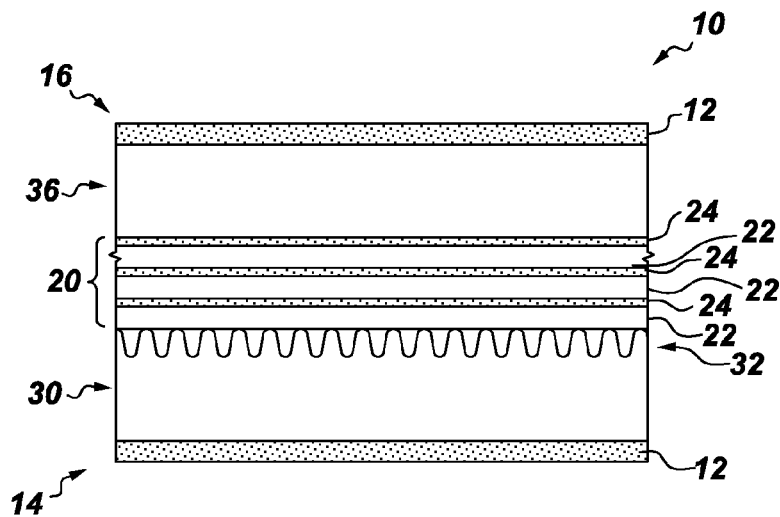
FIG. 1 is a sectional elevation view of a portion of a data storage device, according to an embodiment of the present invention.

Unless defined otherwise, technical and scientific terms used herein have the same meaning as is commonly understood by one of ordinary skill in the art with respect to the presently disclosed subject matter. The terms "first", "second", and the like, as used herein do not denote any order, quantity, or importance, but rather are used to distinguish one element from another. The terms "a", "an", and "the" do not denote a limitation of quantity, but rather denote the presence of at least one of the referenced item, and the terms "front", "back", "bottom", and/or "top", unless otherwise noted, are used for convenience of description only, and are not limited to any one position or spatial orientation.

If ranges are disclosed, the endpoints of all ranges directed to the same component or property are inclusive and independently combinable (e.g., ranges of "up to about 25 wt. %," is inclusive of the endpoints and all intermediate values of the ranges of "about 5 wt. % to about 25 wt. %," etc.). The modified "about" used in connection with a quantity is inclusive of the stated value and has the meaning dictated by the context (e.g., includes the degree of error associated with measurement of the particular quantity). Accordingly, the value modified by the term "about" is not necessarily limited only to the precise value specified.

As used herein, the term "non-linear sensitizer" refers to a material that has a sensitivity having dependence to the light intensity, that is, the sensitivity is high at the high (recording) intensity and low at the lower (readout) intensity.

As used herein, the term "sensitivity" is defined as the amount of index change obtained with respect to the amount of fluence used to irradiate a spot of the film with the laser light.

As used herein, the term "fluence" means the amount of optical beam energy that has traversed a unit area of the beam cross-section (measure, for example, in Joule/cm$^2$), while the term "intensity" means optical radiative flux density, e.g., amount of energy traversing a unit area of beam cross-section in unit time (measure in, for example, Watt/cm$^2$).

As used herein, the term "latent acid generator" refers to a material capable of generating acid or proton when exposed to a stimulus.

As used herein, the term "reactant" refers to a material capable of undergoing a chemical change to form a "product", which results in modulation of refractive index change within the medium.

As used herein, the term "latent chromophore" refers to a material capable of generating a chromophore in response to a stimulus. Further, the term "latent chromophore" refers to a material capable of generating a chromophore, which has an absorption or optical characteristics different from the latent chromophore.

As used herein, the term "change" is meant to include any indirect photochemical reaction of the reactant, e.g., photodimerization or isomerization. The use of the word "indirect" with terms such as photodimerization or photochemical reaction or photoreaction means that the reactant did not receive the energy directly from absorption of a photon, but rather from another molecule (such as, e.g., a sensitizer or mediator) that first absorbed the photon and then transferred a portion of that energy to the reactant that subsequently underwent dimerization.

Aspects of the present invention have been shown to offer advantages over previous data storage devices and methods of manufacture. Aspects of the present invention aim to break the tradeoff to maximize the use of the material capability by using a stacked film structure of functional threshold material and spacing material. Aspects of the present invention also provide a novel way of optical disc manufacturing using a roll-to-roll process, which can result in significantly lower manufacturing cost and higher production efficiency. Aspects of the present invention greatly improve the efficiency of the threshold material capability usage, lower the material requirements, and/or enhance the overall performance of material and system combination.

Referring to FIG. 1, a sectional elevation view of a portion of a data storage device, according to an embodiment of the present invention, is shown. The data storage device, depicted as 10, may comprise a substrate layer 30 with a stacked film structure 20 adjoined thereto. As shown adjoining a second side of the stacked film structure 20 may be a second substrate layer 36. The term adjoining as used herein means either the two, or more, elements are in physical contact with each other or there may be an interstitial layer(s) therebetween the two, or more, elements. That is the two, or more, elements are joined in some fashion so as to result in a single construct.

The substrate layers 30, 36 may comprise a moldable non-photopolymer plastic substrate. Particular examples of suitable polymers for use in the polymer matrix for the substrate layers 30, 36 include, but are not limited to, poly(alkyl methacrylates), such as poly(methyl methacrylate) (PMMA), polyvinyl alcohols, poly(alkyl acrylates), polystyrenes, polycarbonates, poly(vinylidene chloride), poly(vinyl acetate), combinations thereof, and the like. The substrate layer 30 may further include a servo layer 32 therein that comprises grooves, or groove layer and a dichroic layer on the groove layer.

Examples of suitable substrate layers 30, 36, servo layer 32, groove layer, dichroic layer are discussed in the following references, but are not limited to, those materials listed in commonly assigned US Patent Pub. No. 2011/0080823, Ser. No. 12/966,144, entitled "Disc Structure For Bit-Wise Holographic Storage"; and, US Patent Pub. No. 2010/0165817, Ser. No. 12/346,378, entitled "Disc Structure For Bit-Wise Holographic Storage". Both documents are hereby incorporated by reference in their entirety.

The stacked film structure 20 comprises a plurality of functional films 24 and at least one spacer film 22 disposed therebetween the plurality of functional films 24. Each of the plurality of functional films 24 includes a data layer therein. Although FIG. 1 depicts three functional films 24 each located between spacer films 22 and/or substrate layers 30, 36, clearly other quantities of functional films 24 and spacer films 22 and are possible without departed from aspects of the present invention. The quantity of functional film 24 may be in a range from two to about 100 functional films 24. Similarly, a quantity of spacer films 22 may be in range of one to about 100 spacer films 22. In this manner, as depicted, a spacer film 22 is typically disposed between two of the plurality of functional films 24. At the top and/or bottom of the stacked film structure 20 a functional film 24 and/or spacer film 22 may be adjacent to one of the substrate layers 30, 36.

The thickness of each functional film 24 is in a range from about 0.5 μm to about 10 μm. In another embodiment, the thickness of each functional film 24 is in a range from about 0.5 μm to about 2 μm. The thickness of each spacer film 22 is in a range from about 5 μm to about 100 μm. In one embodiment, the thickness of each spacer film 22 is in a range from about 10 μm to about 16 μm in a 0.85 NA optical system. Although FIG. 1 depicts a plurality of spacer films 22 each having approximately the same thickness, in other embodiments the thickness of the spacer films 22 may differ from each other. For example, a first spacer film 22 may have a first thickness and a second spacer film 22 may have a second thickness. In an embodiment, these spacer films 22 having different thicknesses may advantageously be located in adjacent layers in the stacked film structure 20. For example, at, or near, the top of the stacked film structure 20 the spacer films 22 may have, in general, a smaller thickness than the spacer films 22 at, or towards, the bottom of the stacked film structure 20. In another embodiment, at, or near, the top of the stacked film structure 20 the spacer films 22 may have, in general, a larger thickness than the spacer films 22 at, or towards, the bottom of the stacked film structure 20.

The functional film 24 may comprise any suitable combination of polymers, non-linear optical dyes, sensitizers, and material capable of undergoing a refractive index change. Examples of suitable functional film 24 materials include, but are not limited to, those listed in commonly assigned U.S. Pat. No. 8,124,299, Ser. No. 12/551,410, entitled "Methods For Using Optical Data Storage Media"; US Patent Pub. No. 2012/0052232, Ser. No. 12/873,024, entitled "Use of Appended Dyes In Optical Data Storage Media"; US Patent Pub. No. 2011/0053055, Ser. No. 12/551,455, entitled "Compositions, Optical Data Storage Media and Methods for Using the Optical Data Storage Media"; and, U.S. Ser. No. 13/164, 996, entitled "Method of Recording Data in an Optical Data Storage Medium and an Optical Data Storage Medium". All of the aforementioned documents are hereby incorporated by reference in their entirety.

In one embodiment the functional film 24 may comprise a thermoplastic polymer matrix; a non-linear sensitizer capable of absorbing incident radiation having a wavelength and an intensity sufficient to cause upper triplet excitation; a latent acid generator capable of generating an acid upon triplet excitation from the non-linear sensitizer and being substantially non-responsive to said incident radiation; a reactant including a latent chromophore, wherein at least one latent chromophore is capable of forming at least one chromophore by reacting with the acid generated, thereby causing a refractive index change in the optical data storage medium. In another embodiment, the functional film 24 may comprise a thermoplastic polymer matrix; a latent acid generator; a non-linear sensitizer; and a reactant including a latent chromophore. In another embodiment, the functional film 24 may comprise a thermoplastic polymer matrix; a latent acid generator; a non-linear sensitizer; and, a reactant comprising a protected benzophenone.

In another embodiment the functional film 24 may comprise a polymer matrix; a reactant capable of undergoing chemical change upon triplet excitation ($T_n$; n>1), thereby causing a refractive index change; and, a non-linear sensitizer comprising one or more subphthalocyanine (sub-PC) reverse saturable absorbers (RSAs) capable of absorbing actinic radiation at 405 nm to cause upper triplet energy transfer to said reactant.

In another embodiment the functional film 24 may comprise a polymer matrix; a reactant capable of undergoing a photochemical change upon excitation, thereby causing a refractive index change; and, a non-linear sensitizer capable of causing excitation of the reactant when the reactant is exposed to one or more wavelengths of radiation, wherein the non-linear sensitizer is chemically bonded to the polymer matrix.

In another embodiment the functional film 24 may comprise a polymer matrix; a reactant capable of undergoing a photochemical change upon triplet excitation to form a product, thereby causing a refractive index change in the medium; and, a non-linear sensitizer comprising one or more platinum ethynyl complexes capable of absorbing actinic radiation at 405 nm to cause upper triplet energy transfer to said reactant.

The spacer film 22 may comprise any suitable spacer material. Examples of suitable polymers for use in the polymer matrix for the spacer film 22 include, but are not limited to, poly(alkyl methacrylates), such as poly(methyl methacrylate) (PMMA), polyvinyl alcohols, poly(alkyl acrylates), polystyrenes, polycarbonates, poly(vinylidene chloride), poly(vinyl acetate), combinations thereof, and the like.

In this manner, the data storage structure 10 of the present invention may have an aggregated thickness of functional threshold films 24 that are about 10 times less than that of a monolithic functional film when employing the same quantity of data layers therein as in the current art. This reduced effective-thickness of threshold material enables higher dye or sensitizer concentrations in the film and thus a higher sensitivity. If keeping the sensitivity the same, the new data storage structure enables a larger number of data layers within a disc structure.

Although FIG. 1 depicts a data storage structure 10 that includes a single type of functional film 24, in other embodiments of the invention, different materials may be used in different functional films 24 in the stacked film structure 20. For example a first functional film 24 may be comprised of a first material and the second functional film 24 may be comprised of a second material, such that the first and second materials are sensitive to different wavelengths. The first functional film 24 may be of any quantity. The second functional film 24 may also be of any quantity. Similarly, the order and combination of functional films 24 in the data storage structure 10 that have the same and/or different materials is nearly limitless in various embodiments. For example, the stacked film structure 20 may comprise a plurality of functional films 24 such that there is a first set of functional films 24 that are sensitive to light having a wavelength of there is a second set of functional films 24 that are sensitive to light having a wavelength of $\lambda_2$; and, there is third set of functional films 24 that are sensitive to light having a wavelength of $\lambda_3$, such that $\lambda_1 \neq \lambda_2 \neq \lambda_3$. This configuration may be arranged in a multitude of combinations within the data storage structure 10. For example, the stacked film structure 20 may include three different material functional film sets 24 wherein the first material film set 24 (e.g., $\lambda_1$) is located at or near the top region of the stacked film structure 20; the second material film set 24 (e.g., $\lambda_2$) is located at or near the middle region of the stacked film structure 20; and, the third material film set 24 (e.g., $\lambda_3$) is located at or near the bottom region of the stacked film structure 20. In another embodiment, the stacked film structure 20 may include a repeating-type configuration of functional films 24 with the different wavelength materials used. For example, at or near the top of the stacked film structure 20 may be a functional film 24 of a material sensitive to light at $\lambda_1$ while in the next immediate functional film 24 below is a material sensitive to light at $\lambda_2$, and then in the still next below functional film 24 is a material sensitive to light at $\lambda_3$. This three-material "pattern" may then be repeated in successive three-group sets of functional films 24 down through the stacked film structure 20. Clearly, other combination and quantities of different material for use as the functional film 24 can be used than those discussed herein.

An advantage of employing functional films 24 having different materials with different wavelength sensitivities is that the data storage structure 10 may then be used with a data reader and/or read/write device (not shown) such that different readers or devices may be used so that, for example, only one set of the multiple sets of functional films 24 may be writeable or readable in the particular instance. So, for example, in the application of medical records, a data storage device 10 having an embodiment with the multiple materials for the functional films 24 may be configured such that the set of functional films 24 of the first material (e.g., $\lambda_1$) may be readable and/or writeable only by a medical patient; yet the set of functional films 24 of the second material (e.g., $\lambda_2$) may be readable and/or writeable only by a treating physician and/or physician's staff; and, finally. the set of functional films 24 of the third material (e.g., $\lambda_3$) may be readable and/or writeable only by a medical equipment manufacturer. Clearly, other combination and quantities of different material for use as the functional film 24 can be used than those discussed herein.

The data storage structure 10 may further include a suitable barrier coating 12 on one, or both, sides 14, 16 of the structure 100. Any suitable material may be used, now known or later developed, for the bather coating 12. Further, the data storage structure 10 may include one, or more, of an anti-scratch coating and an anti-reflection coating. Although the anti-scratch coating and/or the anti-reflection coating may be placed on both sides 14, 16 of the data storage structure 10, typically these coatings are only applied on the upper side 16 of the data storage structure 10, as the upper side 16 is the side from which read and/or writing actions are conducted on the data storage structure 10.

As a result, the data storage structure 10 of the present invention may ultimately be configured so as to function as a micro-holographic data storage device. In an embodiment the micro-holographic data storage device may comprise a disc. Suitable discs may include, but are not limited to, standard disc sizes, such as a disc having a total thickness of about 1.2 mm or about 100 µm (i.e., "flexible disc"). However, the disc may be constructed to any total thickness including a range from about 100 µm to about 1.2 mm including, for example, discs having a total thickness of 100 µm, 400 µm, 600 µm, or 1200 µm, and the like.

Figure 2:
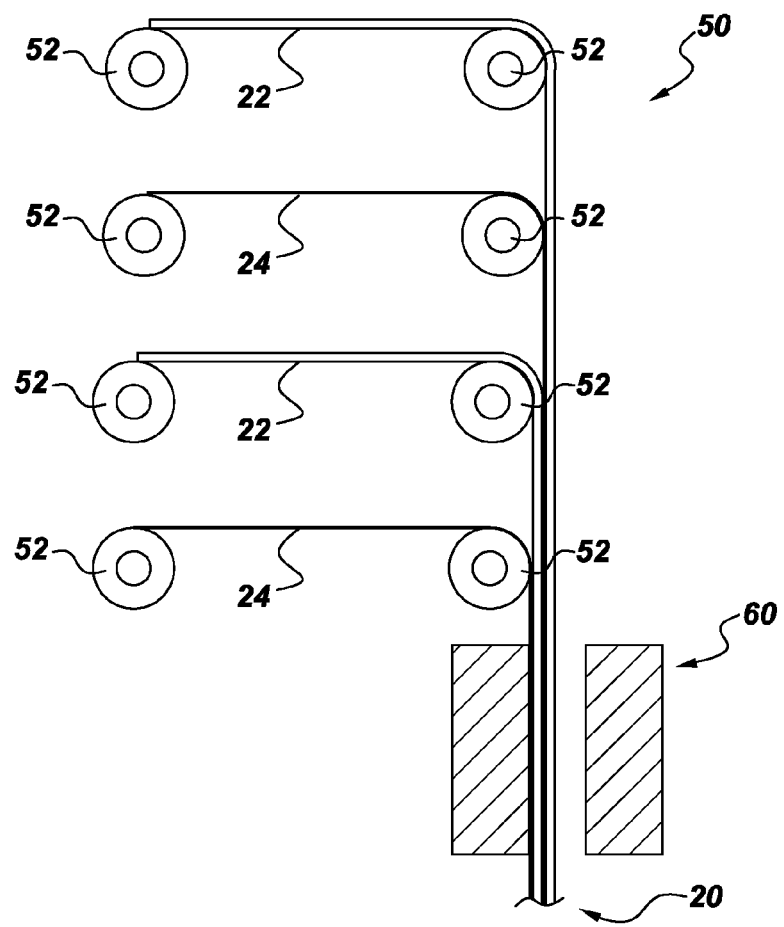
FIG. 2 is a schematic diagram of a system that employs a method of manufacture of a data storage device, according to an embodiment of the present invention.
Figure 3:
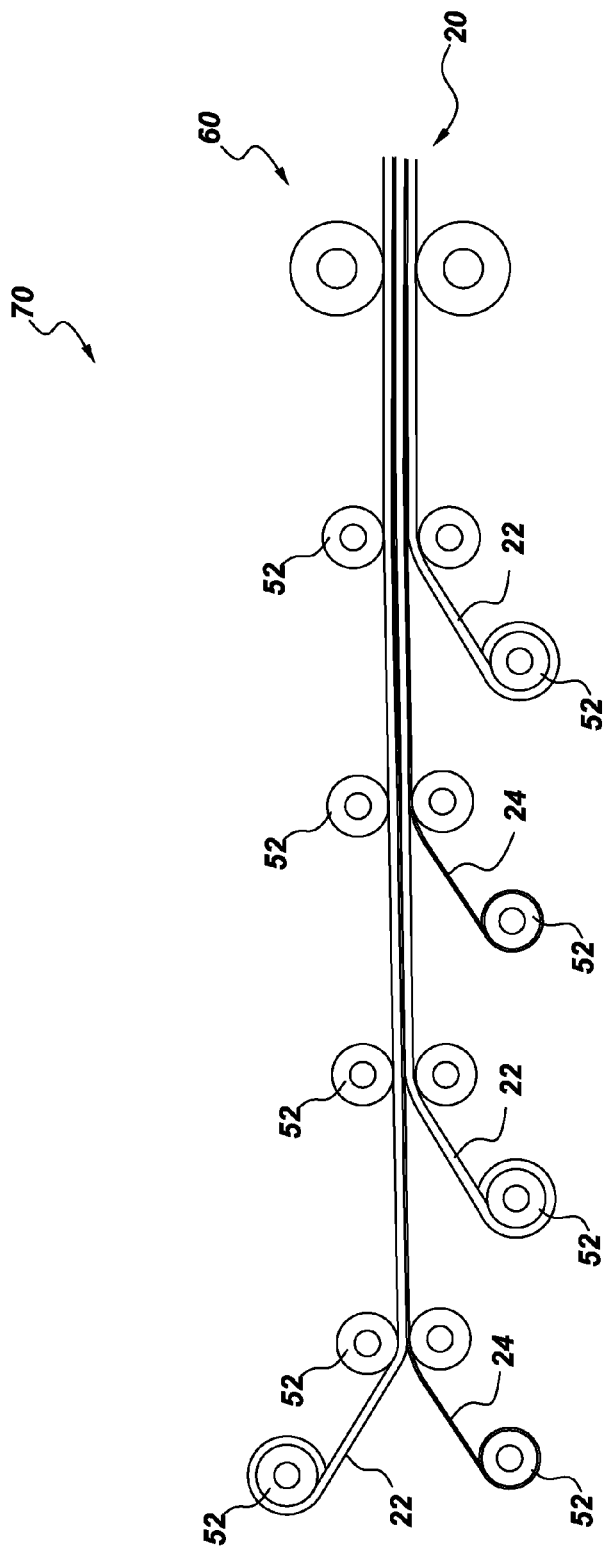
FIG. 3 is a schematic diagram of a system that employs a method of manufacture of a data storage device, according to another embodiment of the present invention.
Figure 4:
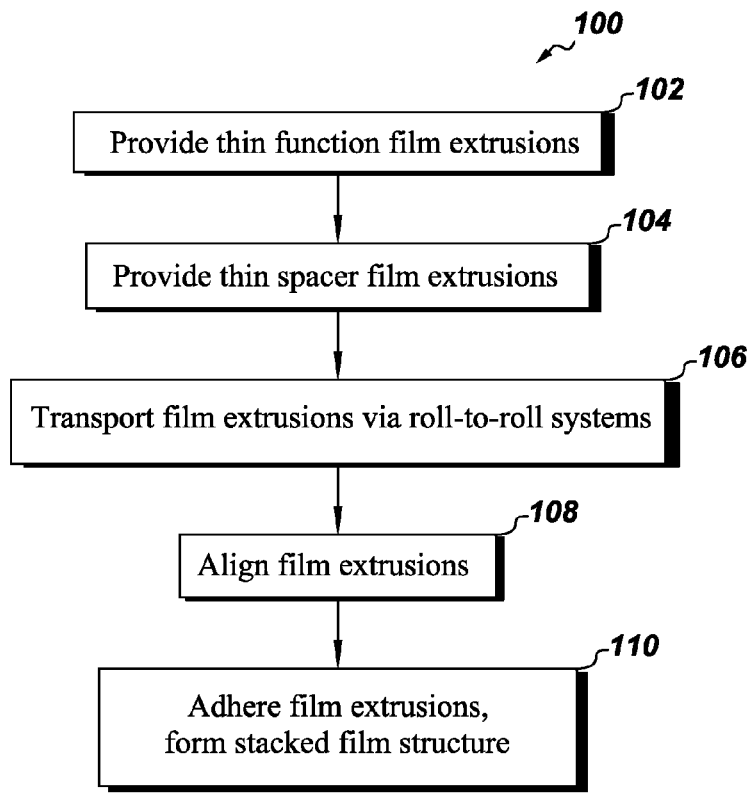
FIG. 4 is a flowchart depicting a method of manufacture of a data storage device, according to an embodiment of the present invention.

Referring now to FIGS. 2 and 3, schematic diagrams of various systems that employ methods of manufacture of a data storage device, according to embodiment of the present invention are shown. Additionally, FIG. 4 depicts a flowchart depicting one method of manufacture of a data storage device that the two systems in FIGS. 2 and 3 may employ. FIGS. 2 and 3 show portions of systems 50, 70, respectively. The systems 50, 70 may employ a plurality of rollers 52 and other known elements (not shown) and an adhering device 60 to construct at least the stacked film structure 20 portion of a data storage device 10 as discussed. Any suitable adhering device 60 may be used including a thermal press (see e.g., FIG. 2), a hot roll lamination device (see e.g., FIG. 3), an optical curing agent, and the like.

The method 100 (FIG. 4) may comprise providing a plurality of thin functional film extrusions at 102. Similarly, a plurality of thin spacer film extrusions is provided at 104. The plurality of thin functional film extrusions and the plurality of thin spacer film extrusions are transported and aligned, at 106 and 108, via the roll-to-roll systems 50, 70 shown. Then the aligned plurality of thin functional film extrusions and the plurality of thin spacer film extrusions are adhered together at 110, thereby forming a stacked film structure 20. The stacked film structure 20 that results is such that a thin functional film extrusion is located between two of the plurality of thin spacer film extrusions. The step 110 is provided by the adhering device 60.

Other aspects in the method 100 may include, but are not limited to, further adhering the stacked film structure 20 to one or more substrate layers, wherein the substrate layer comprises a non-photopolymer plastic substrate and a servo layer therein, thereby defining a data storage device. The device may further be cut to a predefined size and shape, so as to define a suitable data storage disc. Additional coating(s) may be applied to one or both surfaces of the disc including a barrier coating, an anti-reflection coating, and an anti-scratch coating. The barrier coating typically is applied to both sides of the disc, while the anti-reflection coating, and the anti-scratch coating are merely applied to one side (the read/write side) of the disc.

Figure 5:
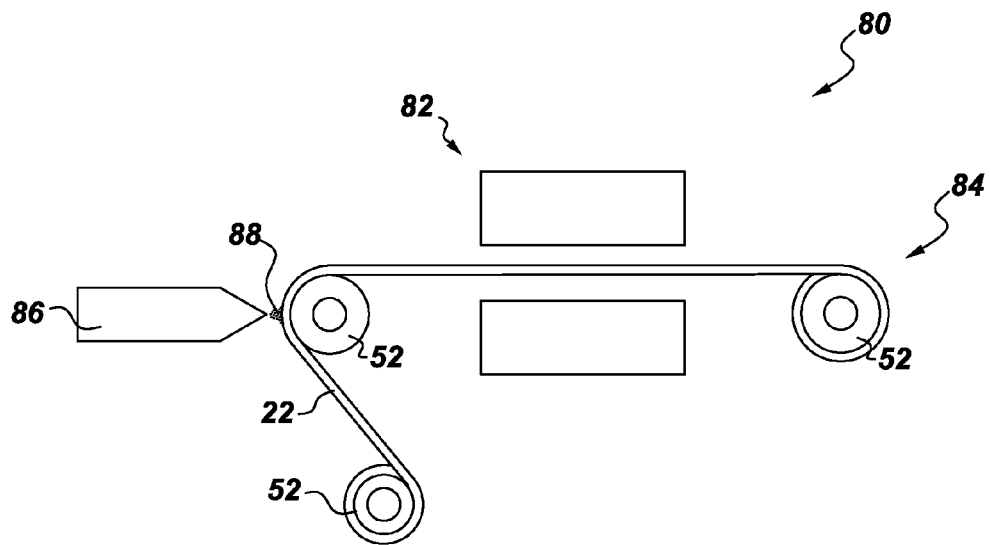
FIG. 5 is a schematic diagram of a system that employs a method of manufacture of a data storage device, according to another embodiment of the present invention.
Figure 6:
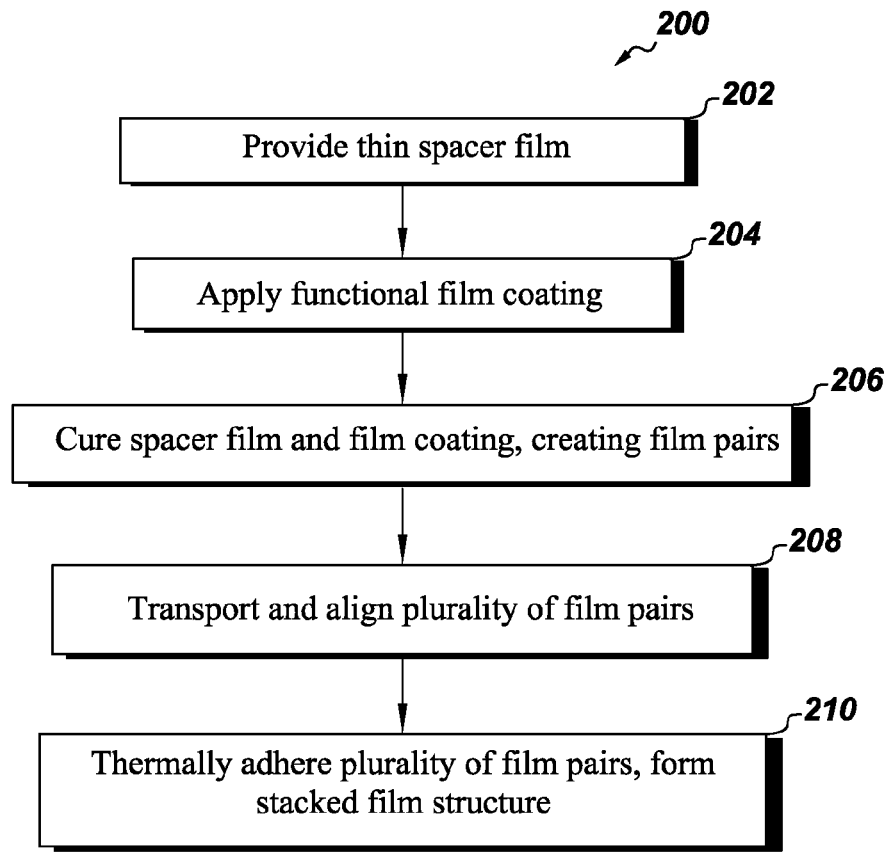
FIG. 6 is a flowchart depicting a method of manufacture of a data storage device, according to another embodiment of the present invention.

Referring to FIG. 5, a schematic diagram of a system that employs a method of manufacture of a data storage device, according to another embodiment of the present invention, is shown. A flowchart depicting the method of manufacture of a data storage device that the system in FIG. 5 may use is shown in FIG. 6. The system 80 may employ a roll-to-roll system that includes rollers 52 and a plurality of other elements (not shown) that are suitable so as to provide a thin spacer film at 202. At 204, the thin spacer film 22 receives from a coating device 86 an application of functional film coating 88 at 204. Then at 206 the thin spacer film 22 and functional film coating 88 thereon are cured by a curing device 82 thereby creating a functional film and thin spacer film pair 84. In this manner multiple functional film and thin spacer film pairs 84 may be created. Then at 208 these plurality of functional film and thin spacer film pairs 84 may be transported and aligned via similar means (e.g., roll-to-roll systems) as those discussed with regards to the systems and methods depicted in FIGS. 2-4. At 210 the aligned plurality of functional film and thin spacer film pairs 84 may be adhered to each other thereby forming a stacked film structure 20. Other film process steps in the method may include surface cleaning, treatment before coating, adding/removing protective masking films, and the like.

The thin spacer film 22 used herein may be from any suitable film means including, but limited to, extrusion, solvent casting, and the like. Additional surface planarization may be needed for optical films.

The coating device 86 may be any suitable device for applying any suitable functional film coating 88 including, but not limited to, a slot die coating, a slide coating, curtain coating, gravure coating, and the like. Similarly, the curing provided by the curing device 82 may be by any suitable means including, but not limited to, heating, ultraviolet curing, and the like. As with the other data storage devices constructed, other steps in the method 200 may include, for example, adhering the stacked film structure to one more substrate layers, cutting the device to a predefined size and shape, and/or applying various coatings as discussed herein.

Figure 7:
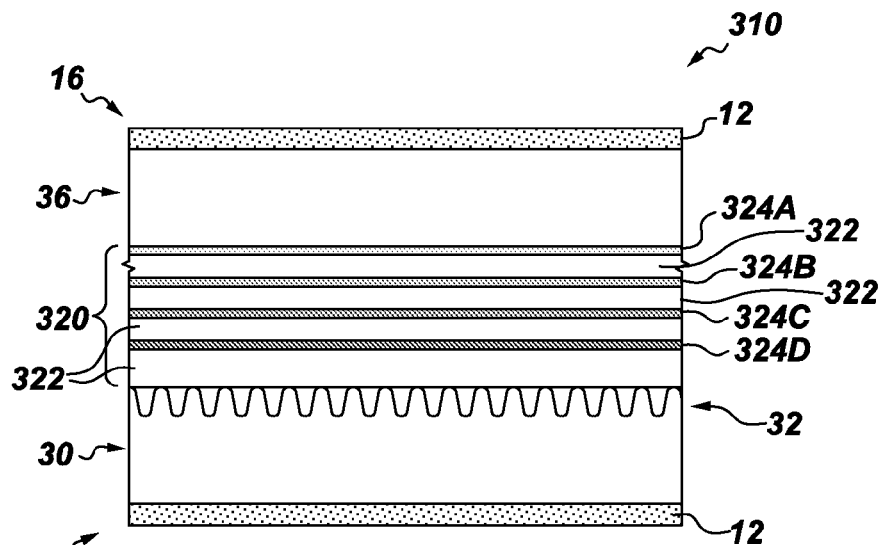
FIG. 7 is a sectional elevation view of a portion of a data storage device according to another embodiment of the present invention.

Referring to FIG. 7, a sectional elevation view of a portion of a data storage device, according to another embodiment of the present invention, is depicted. In this embodiment, the plurality of functional films 324A, 324B, 324C, 324D may comprise any suitable combination of polymers, non-linear optical dyes, sensitizers, and material capable of undergoing a refractive index change. As discussed with regards to the use of different materials for the functional films 24, similarly different concentrations of non-linear optical dye may be used in different layers of functional films 324 in the stacked film structure 320 of the data storage device 310 depicted. While other aspects of the data storage device 310 may be similar to those in the previously discussed data storage device 10, this embodiment has a first functional film 324 that has a concentration of non-linear optical dye that is greater than a concentration of non-linear optical dye in the second functional film 324. Typically, the functional film 324 that has a higher concentration of non-linear optical dye than another functional film 324 is further from a data reader and/or read/write device (not shown) that may be used with the data storage device 310. Thus, in the embodiment shown, a top functional film 324A would have the lowest concentration of non-linear optical dye therein. The next most top functional film 324B would have a higher concentration of non-linear optical dye. Moving downwards in the stacked film structure 320, the third down functional film 324C would have a still higher concentration of non-linear optical dye. Finally, the lowest (or fourth) functional film 324D would have the highest concentration of non-linear optical dye, of the four different film concentrations, in the set of functional films 324. Clearly, other quantities, combinations and variations of non-linear optical dye concentrations, than those shown and discussed herein may be used without departing from aspects of the present invention. For example, some functional films 324 may have different concentrations while other functional films 324 have the same concentration. Similarly, different concentrations and different materials used for the functional films 324 may be used.

While the embodiments illustrated and described herein may be used for a micro-holographic disc, other optical data storage devices may employ aspects of the present invention without departing from the scope of the invention. For example, the data storage device may be a multi-photon storage such as 2-photon storage, and the like.

Therefore, according to one embodiment of the present invention, a data storage device comprises a substrate layer comprising a moldable non-photopolymer plastic substrate and servo layer therein; and a stacked film structure adjoining the substrate layer, the stacked film structure further comprising a plurality of functional films, wherein each functional film includes a data layer; and at least one spacer film disposed between the plurality of functional films.

In accordance with another aspect of the invention, a method of manufacture comprises providing a plurality of thin functional film extrusions; providing a plurality of thin spacer film extrusions; transporting the plurality of thin functional film extrusions and the plurality of thin spacer film extrusions, via a roll-to-roll system; aligning the plurality of thin functional film extrusions with the plurality of thin spacer film extrusions; and adhering plurality of thin functional film extrusions and the plurality of thin spacer film extrusions together, thereby forming a stacked film structure, the stacked film structure defined by a thin space film extrusion located between two thin functional film extrusions.

According to another embodiment of the present invention, a method of manufacture comprises providing a thin spacer film, via a roll-to-roll system; applying a functional film coating to the thin spacer film; curing the thin space film and the functional film thereby creating a functional film and thin spacer film pair; transporting a plurality of functional film and thin spacer film pairs, via a roll-to-roll system; aligning the plurality of functional film and thin spacer film pairs; and thermally adhering the plurality of functional film and thin spacer film pairs together, thereby forming a stacked film structure.

The present invention has been described in terms of the preferred embodiment, and it is recognized that equivalents, alternatives, and modifications, aside from those expressly stated, are possible and within the scope of the appending claims.

What is claimed is:

1. A data storage device comprising:
    a substrate layer comprising a moldable non-photopolymer plastic substrate and a servo layer therein;
    a stacked film structure adjoining the substrate layer, the stacked film structure further comprising:
        a plurality of functional films, wherein each functional film includes a data layer; and
        at least one spacer film disposed between the plurality of functional films; and
    at least one barrier coating on at least one side of the storage device.

2. The data storage device of claim 1, further comprising one of an anti-reflection coating and an anti-scratch coating on one side of the storage device.

3. The data storage device of claim 1, wherein the plurality of functional films comprise a quantity in a range from two to about 100 functional films.

4. The data storage device of claim 1, wherein a thickness of each of the plurality of functional films is in a range from about 0.5 μm to about 10 μm.

5. The data storage device of claim 4, wherein the thickness of each of the plurality of functional films is in a range from about 0.5 μm to about 2 μm.

6. The data storage device of claim 1, the at least one spacer film comprises a plurality of spacer films each disposed between two of the plurality of functional films.

7. The data storage device of claim 6, wherein a first spacer film has a different thickness than a second spacer film.

8. The data storage device of claim 7, wherein the first spacer film and the second spacer film are in adjoining layers.

9. The data storage device of claim 1, wherein a first functional film is comprised of a first material and a second functional film is comprised of a second material, wherein the first material is sensitive to a different wavelength than the second material.

10. The data storage device of claim 9, further comprising a third functional film comprised of a third material, wherein the third material is sensitive to a different wavelength than the first material and the second material.

11. The data storage device of claim 1, wherein the plurality of functional films comprise a material capable of undergoing a refractive index change.

12. The data storage device of claim 11, wherein the material comprises a non-linear optical dye and a concentration of the non-linear optical dye in a first functional film is greater than a concentration of the non-linear optical dye in a second functional film.

13. The data storage device of claim 12, wherein the first functional film is further from one of a data reader and a read/write device than the second functional film.

14. The data storage device of claim 1, wherein the data storage device is configured for micro-holographic data storage.

15. The data storage device of claim 1, wherein the data storage device comprises a disc having a thickness in a range from about 100 μm to about 1.2 mm.

16. A method of manufacture comprising:
    providing a plurality of thin functional film extrusions;
    providing a plurality of thin spacer film extrusions;
    transporting the plurality of thin functional film extrusions and the plurality of thin spacer film extrusions, via a roll-to-roll system;
    aligning the plurality of thin functional film extrusions with the plurality of thin spacer film extrusions, wherein a first thin spacer film extrusion has a first thickness and a second thin spacer film extrusion has a second thickness, wherein the first thickness is different than the second thickness; and
    adhering the plurality of thin spacer film extrusions and the plurality of thin functional film extrusions together, thereby forming a stacked film structure, the stacked film structure defined by a thin space film extrusion located between two thin functional film extrusions.

17. The method of claim 16, the adhering comprising thermally adhering.

18. The method of claim 16, further comprising adhering the stacked film structure to at least one substrate layer, thereby defining a data storage device, the at least one substrate layer comprising a non-photopolymer plastic substrate and a servo layer therein.

19. The method of claim 18, further comprising cutting the data storage device to a predefined size and shape, thereby defining a data storage disc.

20. The method of claim 19, further comprising applying a coating on a at least one of front surface and a back surface of the data storage disc, the coating comprising one of a barrier coating, an anti-reflection coating, and an anti-scratch coating.

21. The method of claim 16, wherein the plurality of thin functional film extrusions comprise a quantity in a range from two to about 100.

22. The method of claim 16, wherein a thickness of each of the plurality of thin functional film extrusions is in a range from about 0.5 µm to about 10 µm.

23. The method of claim 16, wherein the first thin spacer film extrusion and the second think spacer film extrusion are in adjoining layers.

24. The method of claim 16, wherein a first thin functional film extrusion is comprised of a first material and a second thin functional film extrusion is comprised of a second material, wherein the first material is sensitive to a different wavelength than the second material.

25. The method of claim 16, wherein the plurality of thin functional film extrusions include a material capable of undergoing a refractive index change.

26. The method of claim 25, wherein the material comprises a non-linear optical dye and a concentration of the non-linear optical dye in a first thin functional film extrusion is greater than a concentration of the non-linear optical dye in a second thin functional film extrusion.

27. The method of claim 26, wherein the first thin functional file extrusion is further from one of a data reader and a read/write device than the second thin functional film extrusion.

28. The method of claim 18, wherein the data storage device is configured for micro-holographic data storage.

29. The method of claim 19, wherein the disc has a thickness in a range from about 100 µm to about 1.2 mm.

30. A method of manufacture comprising:
providing a thin spacer film, via a roll-to-roll system;
applying a functional film coating to the thin spacer film;
curing the thin space film and the functional film thereby creating a functional film and thin spacer film pair, wherein a first thin spacer film has a first thickness and a second thin spacer film has a second thickness, wherein the first thickness is different than the second thickness;
transporting a plurality of functional film and thin spacer film pairs, via a roll-to-roll system;
aligning the plurality of functional film and thin spacer film pairs; and
thermally adhering the plurality of functional film and thin spacer film pairs together, thereby forming a stacked film structure.

31. The method of claim 30, further comprising bonding the stacked film structure to at least one substrate layer, thereby defining a data storage device.

32. The method of claim 31, further comprising cutting the data storage device to a predefined size and shape, thereby defining a data storage disc.

33. The method of claim 32, further comprising applying a coating on one of a front surface and a back surface of the data storage disc, the coating comprising one of a barrier coating, an anti-reflection coating, and an anti-scratch coating.

34. The method of claim 33, wherein the plurality of functional film and thin spacer film pairs comprise a plurality of functional films comprising a quantity in a range from two to about 100.

35. The method of claim 30, wherein a thickness of each of the plurality of thin functional film coatings is in a range from about 0.5 µm to about 10 µm.

36. The method of claim 30, wherein the first thin spacer film and the second think spacer film are in adjoining layers of the stacked film structure.

37. The method of claim 30, wherein a first functional film coating is comprised of a first material and a second functional film coating is comprised of a second material, wherein the first material is sensitive to a different wavelength than the second material.

38. The method of claim 30, wherein the plurality of thin functional film coatings comprises a material capable of undergoing a refractive index change.

39. The method of claim 38, wherein the material comprises a non-linear optical dye and a concentration of the non-linear optical dye in a first functional film coating is greater than a concentration of the non-linear optical dye in a second functional film coating.

40. The method of claim 39, wherein the first functional file coating is further from one of a data reader and a read/write device than the second functional film coating.

41. The method of claim 31, wherein the data storage device is configured for micro-holographic data storage.

42. The method of claim 32, wherein the disc has a thickness in a range from about 100 µm to about 1.2 mm.

43. The method of claim 30, wherein the applying a functional film coating comprises applying multiple functional film coatings.

44. A data storage device comprising:
a substrate layer comprising a moldable non-photopolymer plastic substrate and a servo layer therein; and
a stacked film structure adjoining the substrate layer, the stacked film structure further comprising:
a plurality of functional films, wherein each functional film includes a data layer; and
at least one spacer film disposed between the plurality of functional films, the at least one spacer film comprises a plurality of spacer films each disposed between two of the plurality of functional films.

45. The data storage device of claim 44, wherein a first spacer film has a different thickness than a second spacer film.

46. The data storage device of claim 45, wherein the first spacer film and the second spacer film are in adjoining layers.

47. A data storage device data storage device comprising:
a substrate layer comprising a moldable non-photopolymer plastic substrate and a servo layer therein; and
a stacked film structure adjoining the substrate layer, the stacked film structure further comprising:
a plurality of functional films, wherein each functional film includes a data layer, further wherein a first functional film is comprised of a first material and a second functional film is comprised of a second material, wherein the first material is sensitive to a different wavelength than the second material, further comprising a third functional film comprised of a third material, wherein the third material is sensitive to a different wavelength than the first material and the second material; and
at least one spacer film disposed between the plurality of functional films.

48. A method of manufacture comprising:
providing a thin spacer film, via a roll-to-roll system;
applying a functional film coating to the thin spacer film;
curing the thin space film and the functional film thereby creating a functional film and thin spacer film pair;
transporting a plurality of functional film and thin spacer film pairs, via a roll-to-roll system;
aligning the plurality of functional film and thin spacer film pairs;

thermally adhering the plurality of functional film and thin spacer film pairs together, thereby forming a stacked film structure;

bonding the stacked film structure to at least one substrate layer, thereby defining a data storage device;

cutting the data storage device to a predefined size and shape, thereby defining a data storage disc; and applying a coating on one of a front surface and a back surface of the data storage disc, the coating comprising one of a barrier coating, an anti-reflection coating, and an anti-scratch coating.

49. The method of claim 48, wherein the plurality of functional film and thin spacer film pairs comprise a plurality of functional films comprising a quantity in a range from two to about 100.

* * * * *

UNITED STATES PATENT AND TRADEMARK OFFICE
CERTIFICATE OF CORRECTION

| | | |
|---|---|---|
| PATENT NO. | : 8,524,348 B1 | Page 1 of 1 |
| APPLICATION NO. | : 13/459840 | |
| DATED | : September 3, 2013 | |
| INVENTOR(S) | : Shi et al. | |

It is certified that error appears in the above-identified patent and that said Letters Patent is hereby corrected as shown below:

On the Title Page, in Item (73), under "Assignee", in Column 1, Line 1,
delete "General Electronics Company," and insert -- General Electric Company, --,
therefor.

In the Specification:

In Column 6, Line 22, delete "wavelength of" and insert -- wavelength of $\lambda_1$; --, therefor.

In Column 6, Line 62, delete "finally." and insert -- finally, --, therefor.

In Column 7, Line 4, delete "bather coating" and insert -- barrier coating --, therefor.

In the Claims:

In Column 11, Lines 28-29, in Claim 27, delete "functional file" and insert -- functional film --, therefor.

In Column 12, Line 17, in Claim 40, delete "functional file" and insert -- functional film --, therefor.

In Column 12, Line 42, in Claim 47, delete "A data storage device data storage device" and insert -- A data storage device --, therefor.

Signed and Sealed this
Twelfth Day of November, 2013

Teresa Stanek Rea
*Deputy Director of the United States Patent and Trademark Office*